March 10, 1925.
C. A. IVERSON
GRAIN SAVING DEVICE
Filed May 13, 1924
1,529,485
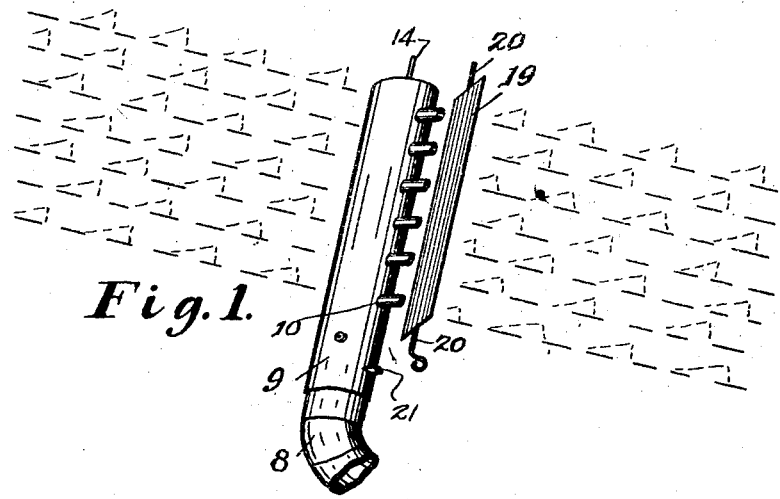
Fig. 1.
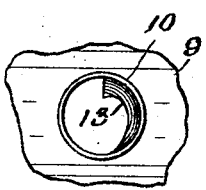
Fig. 3.
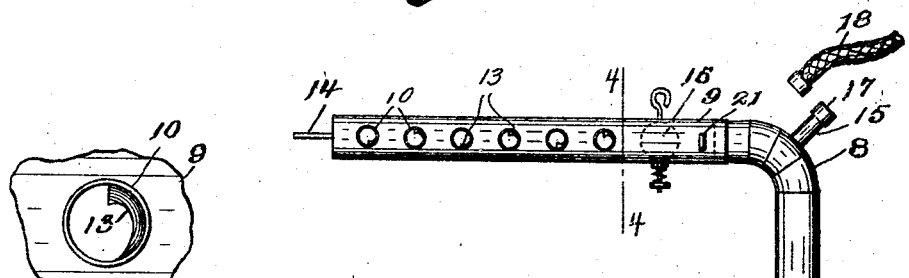
Fig. 2.
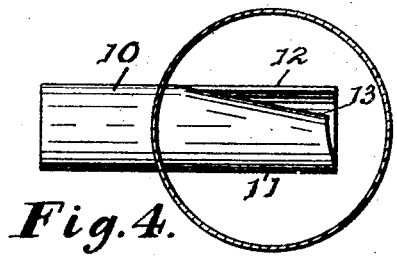
Fig. 4.
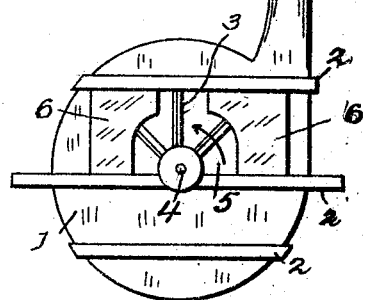
Inventor
Christ A. Iverson
By
Attorney Patented Mar. 10, 1925.

1,529,485

UNITED STATES PATENT OFFICE.

CHRIST A. IVERSON, OF HALE, WISCONSIN.

GRAIN-SAVING DEVICE.

Application filed May 13, 1924. Serial No. 713,109.

*To all whom it may concern:*

Be it known that I, CHRIST A. IVERSON, a citizen of the United States of America, residing at town of Hale, in the county of Trempealeau and State of Wisconsin, have invented certain new and useful Improvements in Grain-Saving Devices, of which the following is a specification.

This invention relates to a grain saving apparatus, designed particularly for use in threshing machines, and adapted in use to direct currents of air under the straw flowing across the shakers, to thereby elevate the straw and assist in separating the grain therefrom.

The invention is primarily directed to a mechanism conveniently and readily attachable to the ordinary threshing machine, and adapted to generate a current of air which is directed to a conveyor arranged across the machine and formed with a series of outlets by which the air may be directed in a plurality of blasts for use.

The invention also contemplates means for providing for an independent air conduit for use in utilizing the air current as a separate cleaner for any part of the machine, the conveyor being provided with a cut off to compel the air to pass through the cleaner conduit when desired.

The invention also contemplates the mounting of the blast conduit or conveyor for rotary adjustment in order to direct the blasts in any desired direction, combined with a deflector also mounted for adjustment and utilized to deflect the blasts after passing beyond the conveyor in any desired direction.

The invention is illustrated in the accompanying drawings, in which:

Fig. 1 is a perspective view illustrating the application of the device.

Fig. 2 is an elevation of the device.

Fig. 3 is a broken elevation of the conveyor viewed from the outside, showing particularly the formation of the air outlets.

Fig. 4 is a section on line 4—4 of Fig. 2.

The improved grain saving device comprises a fan casing 1, which for the purposes of the present invention is preferably provided with transverse bars 2, to provide for securely, though removably, attaching the device to a grain threshing machine. A fan, including properly formed blades 3, is mounted upon a shaft 4, arranged in the casing and adapted to be driven from an outside source to compel a rapid rotation of the fan. The air admission to the fan casing is through an opening 5 in the side walls of the casing, and two of the bars 2 are arranged in such relation to the opening 5 as to slidably support shutters 6, whereby the size of the opening, and therefore the air admission, may be controlled at will. The air under pressure is led through a conduit 7, which for convenience, may if desired, be formed in separable sections, and to and through an elbow 8 on which is rotatably supported what may be termed a conveyor 9. This conveyor is formed with a series of air outlets 10, which extend both inwardly and outwardly of the conveyor wall, the outward extension being of cylindrical formation, and the inward extension, indicated at 11, being longitudinally slit at 12 and a portion of the wall adjacent the slit being curved inwardly at 13 on a radius less than the normal curvature of the section. Successive air outlets are formed with their inlet curved sections in opposite directions, so that the air directed longitudinally of the conveyor will be given a right hand whirl, for example, on entering the first outlet, and a left hand whirl on entering the second outlet and so on. This insures an even distribution of the air from the outlets and compels a rotary air current, which is oppositely acting in adjacent outlets.

The free outer end of the conveyor 9 is provided with a closure of any desired type, having a rod extension 14, adapted to engage any suitable support on the threshing machine to thereby rotatably support the outer end of the conveyor, it being understood that the inner end thereof is rotatably supported on the elbow 8.

The elbow 8 is formed with a pipe outlet 15, and the conveyor 9 is provided with a damper 16, which when operated, will cause the air pressure developed by the fan to pass through the pipe outlet 15. The pipe 15 is normally provided with a closing cap 17, so that the air may be ordinarily directed through the conveyor, the terminal of the pipe 15 being, following removal of the cap, adapted for the connection thereto of a flexible hose section 18, of appropriate length, and preferably terminating in a nozzle (not shown), whereby at will, the air under pressure may be utilized for cleaning the refuse from ordinarily inaccessible parts of the threshing machine at any time.

The invention also contemplates a deflector 19, in the form of a plate, adapted to be rotatably supported through rods 20 on convenient fixed portions of the machine immediately adjacent the delivery end of the air outlets, so that by shifting the deflector, the air currents may be directed as desired.

The structure as a whole is adapted to be arranged on the threshing machine with the conveyor, as indicated in dotted lines in Fig. 1, at a point between the two sets of shakers which convey the straw on its course from the cylinder. The air currents are thus directed under the straw flowing across the shakers, serving thereby to elevate the straw and assist in separating the grain from the same, with the effect of saving this grain.

The conveyor is arranged to be adjusted at will for the control of the direction of the air from the air outlets, said conveyor being for this purpose provided with a projection 21, adapted to be connected to a lever conveniently mounted on the threshing machine, so that through adjustment of the lever, the conveyor may be turned to vary the direction of the air outlets at will.

The deflector, which may be adjusted by hand or by a suitably arranged lever as desired, facilitates the even distribution of the air current passing up from the underside and through the flow of straw. Obviously, by means of the deflector, the air current may be directed in any direction.

Claims:

1. A grain saving device for use with threshing machines, comprising a fan for compelling a current of air, a conveyor to be arranged across the threshing machine, said conveyor being formed with a series of air outlets having their inner ends within the body of the conveyor and a portion of the walls of such inner ends deflected to compel a spiral air current in the passage through the outlets, the wall deflections of adjacent outlets being reversed.

2. A grain saving device for use with threshing machines, comprising a fan for compelling a current of air, a conduit leading therefrom and including an elbow, a conveyor rotatably mounted on the elbow, a series of outlet pipes passing through the wall of the conveyor, a damper in the conveyor to cut off the flow of air therefrom, and an outlet pipe leading from the elbow to provide for the connection of a flexible extension thereto.

3. A grain saving device, comprising a fan casing formed with an air inlet, means for adjusting the size of the air inlet, a fan in the casing, a conduit leading from the fan casing, a conveyor mounted for rotation on said conduit, a series of air outlets leading from the conveyor and projecting beyond the outer wall thereof, and means for rotating the conduit to arrange said outlets in any desired direction, and an adjustable deflector arranged beyond the delivery end of the air outlets.

In testimony whereof I affix my signature.

CHRIST A. IVERSON. [L. S.]